Jan. 13, 1925.　　　　　　　　　　　　　　　　　1,522,924
E. A. SPERRY
POSITION INDICATOR FOR AIRCRAFT
Original Filed Sept. 18, 1918　　　2 Sheets-Sheet 1
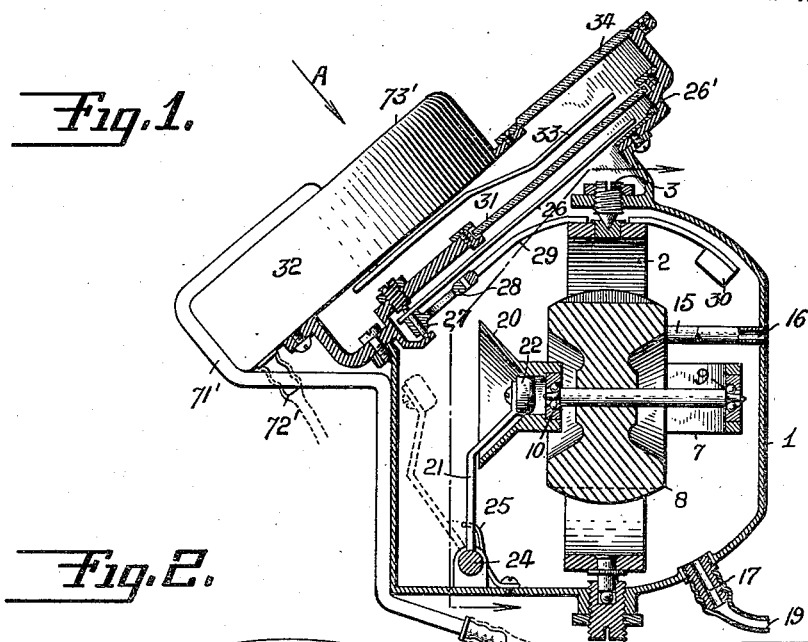
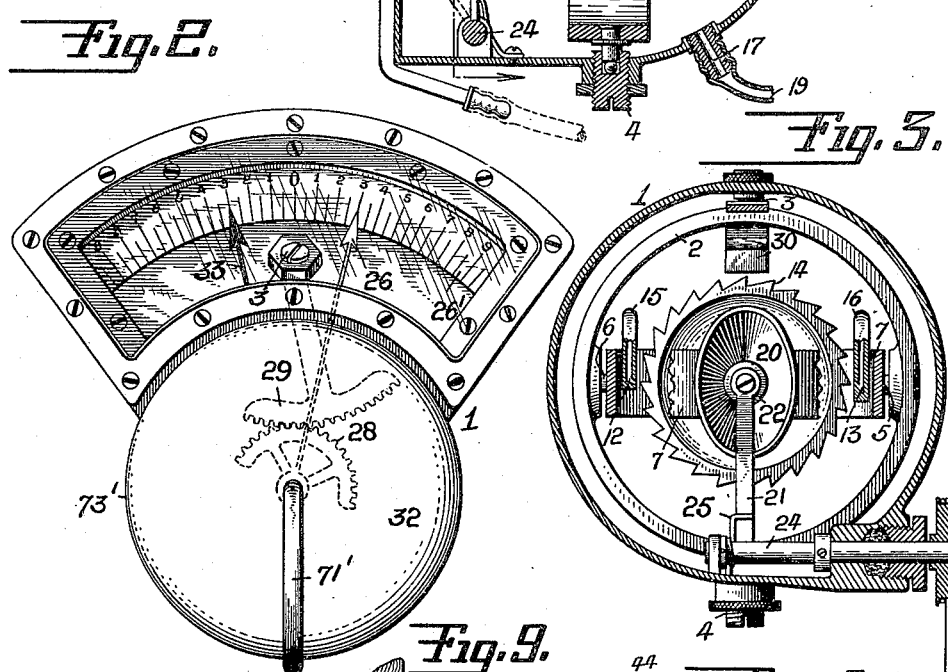
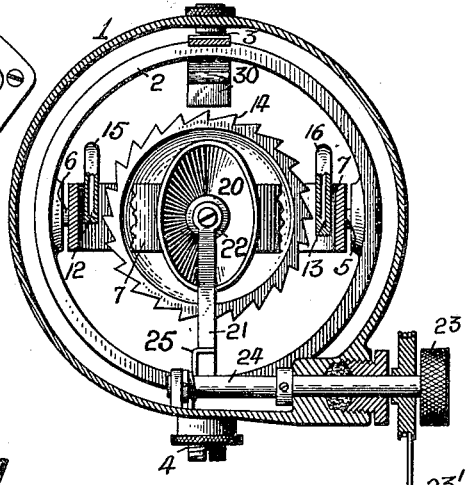
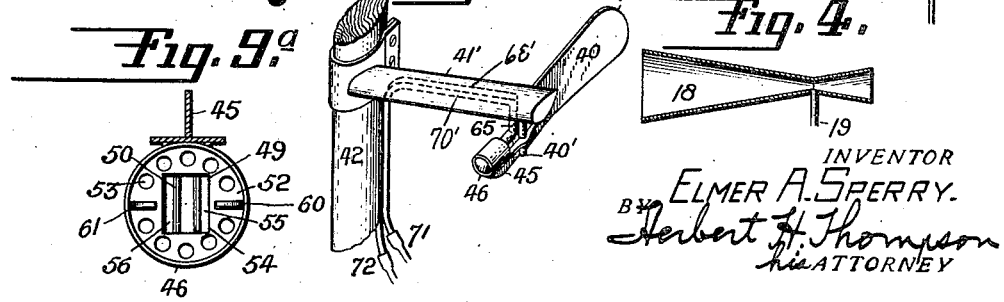
INVENTOR
ELMER A. SPERRY.
By Herbert H. Thompson
his ATTORNEY

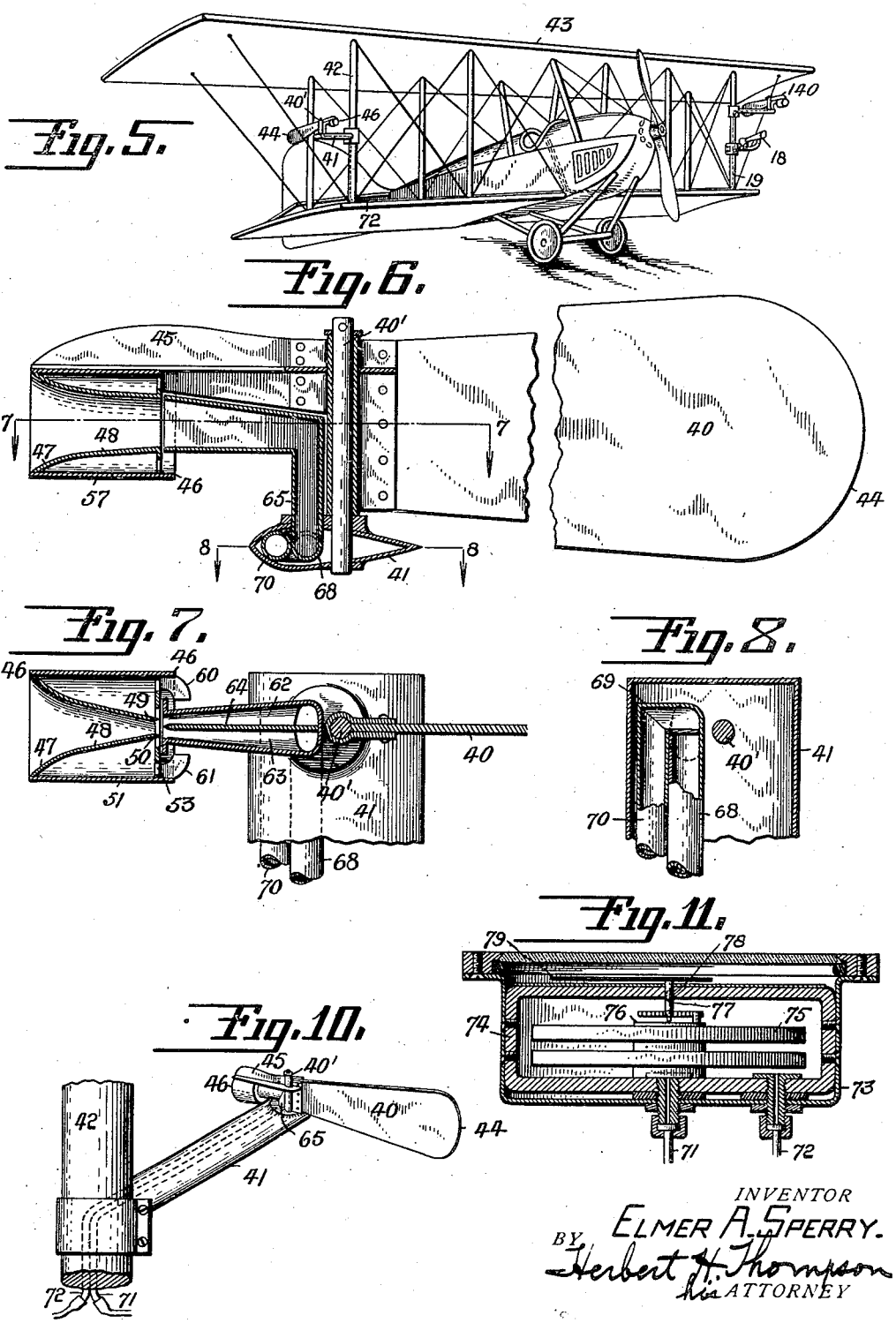

Patented Jan. 13, 1925.

1,522,924

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

POSITION INDICATOR FOR AIRCRAFT.

Application filed September 18, 1918, Serial No. 254,534. Renewed March 19, 1924.

*To all whom it may concern:*

Be it known that I, ELMER A. SPERRY, a citizen of the United States of America, residing at 1505 Albermarle Road, Brooklyn, in the county of Kings and State of New York, have invented certain new and useful Improvements in Position Indicators for Aircraft, of which the following is a specification.

This invention relates to an indicating instrument for aiding aviators in flying in fog, clouds, or at night. It has been found that the average aviator, if he cannot see the earth, soon loses all sense of position so that he is likely to allow the machine to side slip or to get into a tail spin or nose spin or even to turn upside down without becoming aware of the fact.

Many instruments have been devised for indicating to the aviator when he is on an even keel, which depend in their action upon gravity, but such instruments are as a rule so affected by acceleration pressures that they become useless at the very time they are needed. Furthermore, it is found that the magnetic compass used by the aviator for indicating direction also becomes useless as soon as the aeroplane is tilted more than a few degrees so that the aviator finds himself at times without means to aid him in determining that the machine is in a dangerous position or in assisting him to right the machine.

By this invention, I provide two preferably conjointly readable instruments. Firstly: a side slip indicator, or in other words, a means for indicating whether the machine is traveling directly into the wind or sidewise to it, and secondly, a gyroscopic direction indicator.

It will be readily seen that the combined use of these two instruments will at once inform the aviator as to the character of his course. If the gyroscope shows a straight course and the side slip indicator no side slip, the aviator knows that all is well, or on the other hand, if the gyroscope shows that he is turning and the side slip indicator shows no side slip, he knows that he is banked at the proper angle. If, on the other hand, the gyroscope shows that he is flying a straight course and the slip indicator shows that he is side slipping, it will indicate to the aviator at once that his machine is laterally tilted and sliding downwardly sidewise. Then, again, if the gyroscope shows turning and the side slip indicator side slip, the aviator knows that he is incorrectly banked or that he may be approaching a nose or tail spin.

Referring to the drawings in which what is now considered the preferred forms of the invention are shown:

Fig. 1 is a vertical section partly in elevation on the combined gyroscopic course indicator and side slip indicator, comprising what may be termed a position indicator.

Fig. 2 is a plan view thereof, showing the face of the dial, and looking in the direction of the arrow A in Fig. 1.

Fig. 3 is a vertical section of the gyroscope taken at right angles to the section in Fig. 1.

Fig. 4 is a sectional view of the Venturi tube used in operating the gyroscope.

Fig. 5 is an elevation on a small scale of an aeroplane showing the instruments used to operate the side slip indicator.

Fig. 6 is a side elevation partly in section of such operating device.

Fig. 7 is a section taken approximately on line 7—7 of Fig. 6.

Fig. 8 is a sectional view taken approximately on line 8—8 of Fig. 6.

Fig. 9 is a perspective view showing the instrument mounted in an inverted position.

Fig. 9ª is a detailed rear elevation of the pivoted pressure producing member.

Fig. 10 is a perspective view showing such a member mounted on a strut of the aeroplane.

Fig. 11 is a vertical section of a modified form of side slip indicator.

The gyroscopic device is shown as enclosed within a casing 1. The gyroscope proper being mounted in a vertical ring 2, which is pivotally mounted in bearings 3 and 4 in the frame 1. In normally horizontal bearings 5 and 6 in the vertical ring is pivoted a rotor bearing ring or frame 7, within which the rotor 8 of the gyroscope is mounted on anti-friction bearings 9 and 10. The gyroscope is hence free to turn about a vertical axis, to oscillate about a horizontal axis and to rotate about a horizontal axis, being thus mounted for three degrees of freedom.

The gyroscope may be driven by air jets 12 and 13 which direct air against blades 14, preferably cut in the periphery of the rotor and extending across substantially the entire breadth of the same. Said jets are shown as supplied by tubes 15 and 16 which communicate with the exterior of the casing 1. A flow of air through the said tubes is preferably produced by exhausting the air from within the casing 1 through opening 17.

The preferred method of exhausting the air from the casing is to connect the said opening 17 with a Venturi tube 18 on the aeroplane such as is shown in Figs. 4 and 5, by means of a pipe 19 leading into the restricted portion of said tube at which, as is well known, a very considerable negative pressure exists.

Mounted upon the ring 7 is the bell shaped or oval member 20 and cooperating therewith is pivoted arm 21 having a button 22 thereon. Said arm and button are normally held in an up-right position by means of a spring 25 with the button engaging within the bell mouth 20, as shown in Figs. 1 and 3, so that the gyroscope is locked both about the vertical and horizontal axes. The button may be retracted, however, to the dotted line position shown in Fig. 1 by means of a knurled knob 23, mounted on the shaft 24, to which arm 21 is secured, or by means of a cord 23' extending to the observer's seat.

For indicating the position of the gyro within the casing an indicator or pointer 26 is provided. Said pointer is shown as secured to a pin 27 to which is also secured a gear sector 28. To the vertical ring 2 is secured a cooperating gear sector 29, so that as the gyro rotates, the pointer 26 will be rotated with the gyro and preferably to a greater extent. A scale 26' may be provided for the pointer. A balancing arm 30 is shown as secured to the opposite side of ring 2 from the gear sector 29. Casing 1 is closed on top by the partition 31 of glass.

On said casing 1 may be mounted a side slip indicator 32. The side slip indicator is provided with a pointer or other indicating means 33 preferably positioned so as to read conjointly with the pointer 26, the pointer 33 being shown as mounted directly above the other pointer and readable through the same window 34.

The interior construction of the side slip indicator may be substantially identical to that described in connection with Fig. 11, described hereinafter. It is connected to the actuating means through tubes 71' and 72' leading into the interior of air tight casing 73'.

For actuating the side slip indicator any suitable device may be employed. A preferred means, however, comprises a vane 40 pivotally mounted on a pin 40' on an arm 41 having a stream line section and clamped to a strut 42 of the aircraft 43. The vane comprises the usual tail 44 and a forwardly extending member 45 to which is secured a hollow member 46 having a bell mouth 47. The walls 48 of said member 46 taper more sharply in plan (Fig. 7) than in elevation (Fig. 6), so that the rear portion of said member is in the shape of a vertical rectangle (Fig. 9ª) having sharply defined lateral walls 49 and 50.

The member 46 has a cylindrical casing 51 enclosing the bell mouth 47 and extending slightly in the rear thereof. A plate 52 having a plurality of openings 53 therein is secured within said member 51 near the rear portion thereof and near the termination or near the walls 49 and 50 of the bell mouth.

Said plate also has a rectangular opening 54 therein which is of greater dimensions laterally than the bell mouth and leaves therefor rectangular openings 55 and 56 on either side of the end walls of the bell mouth.

The pressure within the space between the cylindrical walls of member 51 and the walls 48 of the bell mouth 47 will be considerably reduced below that of the atmosphere by the entraining action of the wind rushing past the instrument which will withdraw air through the holes 53. The member 51 may also be provided with lugs 60 and 61 for a purpose hereinafter described.

In a position immediately behind the bell shaped member 46 are a pair of tubes 62 and 63, placed side by side as indicated in Figs. 6 and 7. The two tubes terminate adjacent the plate 52, the wall 64 separating the tubes, being normally midway between the end walls 49 and 50 of the bell mouth 47 as indicated in Fig. 7. Said tubes are preferably fixed to the aeroplane and are shown leading rearwardly to a point 65 near the pivot point 40', thence downwardly to within the stream line arm 41. Within said arm the tube 63 is joined to the laterally extending tube 68 while the rear-most tube 62 is connected through an elbow 69 to a second parallel tube 70. (See Fig. 8.) The two tubes run side by side through said member 41 to the strut where they are connected preferably to rubber or other flexible tubing 71 and 72 leading to the side slip indicator.

The indicator is constructed to operate preferably on differences in pressure between the two tubes. For this purpose, one of the tubes 72 is shown as leading through the exterior casing 73 and air tight casing 74 into the interior of the instrument. Within said instrument are mounted one or more hollow flexible containers 75 of the type commonly employed in aneroid barometers or the like. The other tube 71 is connected to the interior of the containers 75 so that as the relative pressure in the two tubes varies, movement will be imparted to the center plate 76 on the container.

Mounted on said plate is a post 77, having a thread with a steep spiral pitch 78 thereon. Said post is threaded in casing 74 so that it is revolved as it is moved axially. On said post is mounted an indicator 79.

The preferred specific construction of this instrument, which forms no part of this invention, is more completely described in the co-pending application of Francis M. Champlin in improvements in speed indicators for aircraft, Serial No. 178,475, filed July 3, 1913, and need not be further described herein.

The operation of the side slip indicator is as follows:

As long as the bell mouth 47 is in the central position shown in Fig. 7, it will be apparent that equal pressure will be transmitted to the two tubes 62 and 63, but if a side wind strikes the tail 44, the member 46 will be rotated probably until one of lugs 60 or 61 strikes tube 62 or 63 as the case may be, thereby displacing the sharp edges 49 and 50 at the termination of the bell mouth to one side or the other of the metal wall 64 separating the tubes.

This will immediately result in a greater pressure being transmitted to the tube toward which the bell mouth moves, since the other tube 63 (for instance) will either be covered by a portion of the plate 52 at this time, or an opening 55 or 56 in said plate will be brought opposite the said tube so that the pressure in tube 63 will either be cut off or reduced below atmospheric pressure as explained.

By this means it will be seen, therefore, that not only will the pressure in one tube increase above the atmospheric pressure, but the pressure in the other tube is decreased below atmospheric pressure, so that a maximum difference in pressure between the two tubes is created. It is this difference in pressure which is measured by the indicator.

If desired, a plurality of actuating instruments 40 and 140 may be used, either or both of which may be employed to operate the side slip indicator. If both are employed at once double the accuracy may be obtained.

When the aeroplane is flying the operation of the various parts is entirely automatic since the passage of the aeroplane through the air creates a wind velocity which is ample to run the small gyroscope at high velocity by creating a low vacuum within the gyro casing 1 by action of the Venturi tube 18, as explained, which will create a marked difference in pressure to be registered on the side slip indicator in case any side pressure occurs. In using the instrument the gyroscope is normally locked and the pointer 26 held at zero on the scale.

If the aviator observes that the pointer 33 of the side slip indicator is registering, or if he for any reason desires to ascertain the condition of flight he pulls cord 23' or turns the knob 23 releasing the gyroscope and observes the pointer 26 for a few minutes, he will note whether or not the aeroplane is turning. This reading taken in conjunction with the side slip indicator will show whether he is flying on even keel; or in short will show all the conditions of flight necessary for safety.

When the plane is flying straight with zero side slip it is always flying level and this is the condition sought in flying in cloud, fog or at night and which is at once indicated by the combined and cooperating instruments forming this invention. When level and straight flight is secured then, and then only, is the compass usable and dependable. By the relative positioning of the pointers and dial it will be observed that when the two indicators are in predetermined positions (in this case, coincident), there is given to the operator a single indication embodying a plurality of features necessary to good flying, i. e., straight flying on an even keel (no side-slipping).

In accordance with the provision of the patent statutes I have herein described my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use. Thus, the position for mounting the vane 40 and attached parts shown in Fig. 6 is not essential. In fact, the inverted position illustrated in Fig. 9 possesses many advantages thereover, in that rain and moisture will not run into the instrument, as in the first form, since tubes 68' and 70' are in this instance above the mouth 46. In addition the arm 41' is shown as downwardly inclined to assist in preventing water getting into the system.

Having described my invention, what I claim and desire to secure by Letters Patent is:

1. A side slip indicator for aeroplanes, comprising a tubular member having a flaring mouth and restricted opening at the rear, a second tubular member having an opening adjacent said other opening, one of said members being pivotally mounted, a wind responsive device secured to said pivotally mounted member, and a pressure indicator connected to the second mentioned tube.

2. As a means for indicating inclination on aircraft, a gyroscope for indicating the character of the course and a side slip indicator for showing the direction of the wind with respect to the fore and aft line of the craft, and so arranged relative to each other that coincidence of said indicators indicates straight flying on an even keel.

3. A side slip indicator for aeroplanes, comprising a tubular member having a flaring mouth and restricted opening at the rear, a chamber secured to and in communication with said tube such that a negative pressure is created therein, a plurality of other tubular members having openings adjacent said rear opening and chamber, one of said members being pivotally mounted, a wind responsive device secured to said movable member, and a relative pressure indicator connected to said last named tubes, whereby a side wind will cause unequal pressure in the tubes and register an indication.

4. In a position indicator for aircraft, an element adapted to maintain a position in azimuth, an indicator secured thereto, a second instrument for indicating side slip, and an indicator actuated thereby and positioned for conjoint reading with said first indicator so that coincidence of said indicators indicate straight flying on an even keel.

5. A side slip indicator for aircraft comprising a member pivotally mounted thereon and adapted to turn into the wind, air deflecting means on said member, a tube mounted adjacent said means whereby the pressure therein is varied upon turning said member, and an air pressure responsive device connected to said tube.

6. A side slip indicator for aircraft comprising an air deflecting member, a tubular member mounted adjacent thereto, one of said members being pivotally mounted, a wind responsive device secured to the pivotally mounted member, and a pressure indicator connected with said tubular member.

7. A side slip indicator for aircraft comprising a plurality of members adapted to receive the pressure of the wind, differential means for registering relative variations of pressure in said members and means responsive to the direction of the wind with respect to the aeroplane for altering the relative pressure in said members.

8. The combination with an aeroplane, of a vane pivotally secured thereto, a pressure registering means adapted to register the pressure at a predetermined opening, and means secured to said vane for varying the pressure at said opening in accordance with the direction of the wind.

9. As a means for indicating inclination of an aircraft, a side slip indicator for showing the direction of the wind with respect to the fore and aft line of the craft, a gyroscope mounted for free turning about the vertical axis, means for locking and releasing said gyroscope at will, and an indicator connected to said gyroscope for showing whether the course is straight or curved, said indicators being positioned for conjoint reading so that coincidence of said indicators indicates straight flying on an even keel.

10. A level indicator for aircraft comprising a gyroscope, an indicator, means connecting said gyroscope and indicator for actuating the latter on precession of the former, a device responsive to side slip of the aircraft, an indicator actuated thereby and a common reference member on which both of said indicators are readable, said indicators being so arranged relative to each other and to said common reference member that coincidence of said indicators indicates straight travel of the craft on an even keel.

In testimony whereof I have affixed my signature.

ELMER A. SPERRY.